United States Patent
Zwieg

[11] 3,799,627
[45] Mar. 26, 1974

[54] CROSS ROD REPAIR FOR SNOWMOBILE TRACKS

[76] Inventor: Arvin E. Zwieg, Rt. No. 1, Maple Plain, Minn. 55359

[22] Filed: July 14, 1972

[21] Appl. No.: 271,778

[52] U.S. Cl.................................. 305/38, 29/401
[51] Int. Cl........................................... B62d 55/24
[58] Field of Search ............ 305/35 EB, 36, 37, 38; 29/401

[56] References Cited
UNITED STATES PATENTS

| | | | |
|---|---|---|---|
| 2,707,658 | 5/1955 | Grenier | 305/35 EB |
| 2,052,958 | 9/1936 | Webb | 29/401 |
| 3,416,845 | 12/1968 | Scanland | 305/38 |
| 2,899,242 | 8/1959 | Bombardier | 305/38 |

FOREIGN PATENTS OR APPLICATIONS

| | | | |
|---|---|---|---|
| 272,866 | 7/1969 | Austria | 305/38 |
| 846,080 | 7/1970 | Canada | 305/35 EB |
| 424,043 | 9/1969 | Canada | 305/38 |

Primary Examiner—Richard J. Johnson
Attorney, Agent, or Firm—Dugger, Johnson & Westman

[57] ABSTRACT

A repair device for repairing broken cross rods or cleats on snowmobile drive belts or tracks where the cross rods or bars are molded into the track. The cleats are reinforcing and traction devices for the track, and also provide lugs against which the drive sprockets for the snowmobile track will run. The rods used are subject to breakage, and once broken, it is usually necessary to throw away the entire track or belt because the rods cannot be welded satisfactorily. The present device presents a repair unit for repairing the broken cross bars.

5 Claims, 4 Drawing Figures

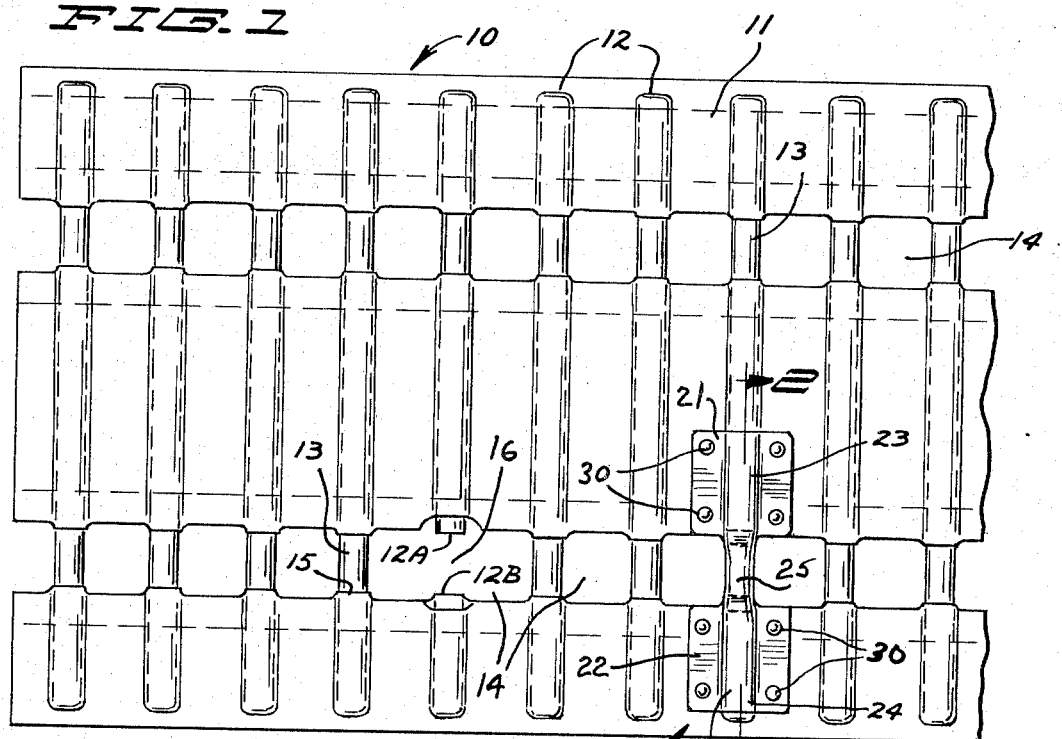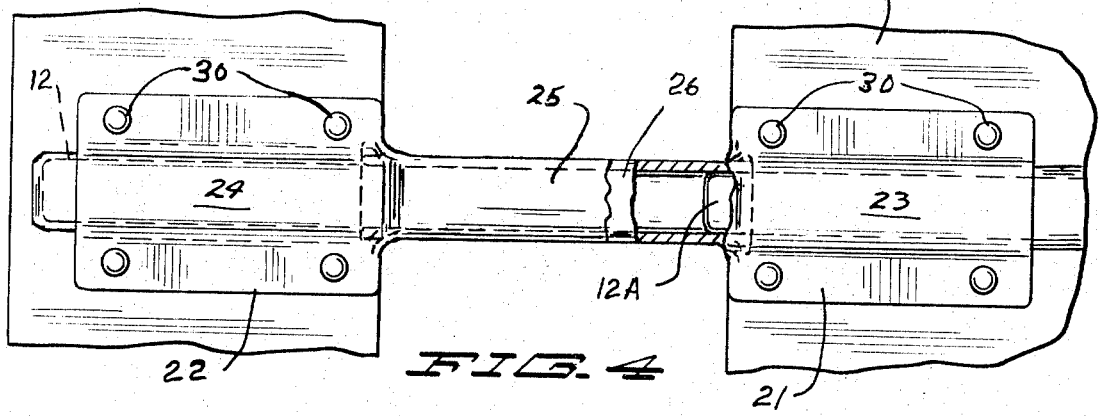

CROSS ROD REPAIR FOR SNOWMOBILE TRACKS

BACKGROUND OF THE INVENTION

1. Field of the Invention.

The present invention relates to a repair device for repairing cross rods or bar reinforcing members in molded snowmobile tracks or drive belts.

2. Prior Art.

In the prior art the use of molded snowmobile tracks or drive belts has become quite well known, but the repairing of the reinforcing rods that are used has heretofore been impossible because of the problems involved in attempting to repair this molded drive belt unit.

U.S. Pat. No. 3,436,128 sets forth the problems with present drive belts where a rod breaks in a molded track and individual replacement of rods is not possible. A completely new belt is required. A replaceable reinforcing rod is disclosed in U.S. Pat. No. 3,436,129. However no hint is made at how a repair could be made in a track that has the reinforcing rods molded into place.

Various types of conventional molded tracks are in wide usage and therefore the molded track of the present invention is shown only schematically.

SUMMARY OF THE INVENTION

The present invention relates to a repair device that can be used for repairing broken cross rods or bars in snowmobile tracks.

The repair device includes a repair unit that can be riveted into place, and which forms means for piloting and holding the broken ends of the cross bar. The unit forming the repair device is installed in a preselected manner that insures proper alignment of the cross bar ends and secure fastening of the repair device onto the snowmobile belt so that the broken ends are held securely and in alignment. The repair device provides a new drive surface for the teeth of the drive sprockets to engage to drive the belt.

The cross rod repair device comprises a member that has a center tube, and the tube is made to receive and closely fit the ends of the broken rod, after a portion of the broken rod has been removed. The repair device has flange members that rest against the belt and are riveted into place. The flanges are provided with recesses so they fit over the molded cross rods. The junction tube is held in proper alignment with the cross rods when the repair unit is riveted into place.

It should be noted that the conventional snowmobile drive belts or tracks have wear tubes over the cross rods in alignment with the drive sprockets, which are of proper size for the snowmobile drive sprockets to drive against. The tubular members used in the repair device are of an outside size equal to the wear tubes normally positioned over the cross rods so that the repair device is of proper size for the drive sprockets and the drive belts will therefore be driven in a normal manner after repair.

The method of installing the repair unit includes the removal of a section of the broken rod, cleaning away the molded rubber from end portions of the rod on opposite sides of the removed portion, slipping the repair device into place so that the tubular member receives and pilots or guides the exposed ends of the broken rod, and then fastening the side flanges of the repair device into place on the track.

BRIEF DESCRIPTION OF THE DRAWINGS

FIG. 1 is a bottom plan view of a portion of a snowmobile drive belt having molded cross rods or cleats and showing a cross rod repair unit made according to the present invention installed thereon;

FIG. 2 is a sectional view of a portion of a cross rod repair unit made according to the present invention taken as on line 2—2 in FIG. 1 with the lower side of the belt oriented downwardly;

FIG. 3 is a sectional view taken as on line 3—3 in FIG. 2; and

FIG. 4 is an enlarged plan view of the repair unit of the present invention.

DESCRIPTION OF THE PREFERRED EMBODIMENT

The preferred embodiment of the cross rod repair device is shown installed in the figures on a snowmobile drive belt or track made for two drive sprockets. The repair units can be used on drive belts having only one centrally located drive sprocket as well.

Referring to FIG. 1, a snowmobile drive belt illustrated generally at 10 comprises a molded endless belt assembly that comprises a elongated belt 11 with a plurality of transversely extending longitudinally spaced substantially parallel cross rods or cleats 12 molded therein. The cross rods 12 as shown are molded in place so that the cross rods with the molded rubber around them form ridges in the belt that form the drive cleats for the belts. The cross rods extend substantially all the way across the belt, and end just short of the marginal edges of the belt.

The snowmobile drive belt 10 also as shown is for utilization with two drive sprockets that are spaced apart on the drive shafts for the snowmobile, and the sprockets have teeth which drive against the rods 12 that are molded into place. Each of the rods 12 carries sprocket engaging rollers or wear tubes 13. The wear tubes 13 are aligned with the sprocket drive teeth and the teeth of the sprockets extend through provided openings 14 between the rollers or tubes 13. The sprocket teeth will project through the openings 14 when they drive against the tubes 13 which are mounted over the cross rods 12. In the location where the rollers 13 are mounted there is no molded rubber on the rods, but merely the tubular sections 13. As shown, there are openings 14 in two parallel rows adjacent the marginal edges of the belt. The belt can be any desired width for the snowmobile being used.

In traveling over rough ground where there are shock loads encountered the cross rods 12 which are molded into place will sometimes snap. These cross rods are generally of very high strength, hardened steel, and when they break, it is practically impossible to satisfactorily weld them. Therefore when a break occurs the complete belt or track is generally scrapped and a new one has to be purchased. Sometimes the operator of a snowmobile will not replace the belt immediately, and a section of the cross rod can break out. When this happens, the sprocket will usually slip, and perhaps twist the drive shaft for the sprockets or it may load the teeth of the sprockets so the sprocket itself will break.

As shown in FIG. 1, when a cross rod 12 breaks it usually occurs at the line shown at 15, right at one of the ends of one of the sprocket wear tubes 13 on the cross rod 12.

In using the cleat repair device of the present invention, the first step is to prepare the broken section. The broken rod is cut to leave a gap 16, and the end portions 12A and 12B of the broken rod are stripped of the molded material so that the two portions of the rod on opposite ends of the gap 16 are exposed as shown. Then, a repair device indicated generally at 20 is installed on the broken rod. The repair device 20 comprises a unitary member having a pair of flange portions 21 and 22, respectively, that are formed with raised center portions 23 and 24 that are of size to fit over the hump of molded rubber surrounding the rods 12 adjacent the openings 14. The flanges have side planar portions that fit down flat against the flat portions 11 of the belt between the rods 12. The flanges 22 and 23 are joined by a junction section 25 that is used for mounting a repair tube 26. The repair tube 26 is welded to the center section 25. As shown the section 25 is offset from the general plane of the planar portion of flanges 21 and 22, so that the tube 26 will be in alignment with the rod 12 that is to be repaired when the planar flange portions 21 and 22 are placed flat on the belt portions 11. As shown, the tube 26 is selected so that its inside shape and size permit it to fit closely over the rod portions 12A and 12B that have been previously cleaned off. The tube 26 has an outside size and shape that is the same as the wear tubes 13 that are normally positioned over the rods 12 in the areas where the sprockets run.

In the repair method, the end sections 12A and 12B are slipped inside the interior of the tube 26, first at one end of tube 26 and then at the other, and the flange portions 21 and 22 are fastened to the flat portions 11 of the belt 10 by rivets indicated at 30, or with suitable other fastening devices. The rivets 30 can be pop rivets if desired which are presently known and quite easy to install. When riveted in place the repair device is in working position and the repair is completed.

Thus it can be seen that a quick repair is made for the broken rod 12 and the repair tube will keep the ends of the portions of the broken rods in alignment and the flanges 21 and 22 will hold the adjacent sections of the belt securely so that the repair unit will not bend or break when it is being driven by a sprocket of the snowmobile. It should also be noted that additional rivets can be provided if desired, and the flange sections 21 and 22 can be of greater length than that shown. The flanges riveted to the belt on opposite sides of the openings 14 keep the belt sections from separating so the end portions 12A and 12B remain in place inside the tube 26.

While the tube 26 is shown as having an oval cross section, the tube can be round or square or any other desired cross sectional shape, as long as the inside of the tube mates snugly over the ends of the cross rods of the track being repaired, and that the outside shape and side of the tube on the repair unit is compatible with the sprocket being utilized.

The repair unit can be easily installed merely by breaking out the desired section of the old rod adjacent the break to leave a gap that is of less length than the replacement tube. As presently used, a one half inch section of the old rod is cut out leaving the space 16, and the tube 26 is two and one-quarter inches long, leaving a three-eights inch overlap at the ends of the tube 26 and the ends of the broken rod. In other words, the rod ends 12A and 12B slip into the tube 26 three-eights of an inch on each end, more or less. Then the support flanges 21 and 22 are quickly riveted into place to hold the repair device in position.

The tracks have sufficient resiliency so that the tube 26 can be slid over one end of the broken rod 12, and the track stretched to slip the other end of the tube 26 over the end of the broken rod. However when the flange members 21 and 22 are securely riveted into place, the broken portions cannot separate. The ends of the rod portions act as pilot members or guides for holding the repair unit in place for driving from the drive sprockets.

The snowmobile track has been described as a molded track, and this is the primary type of track used. However, the repair device may be used on any snowmobile track to repair broken cross rods, even if the rods are secured in other ways than molding, or even if the rods are replaceable.

What is claimed is:

1. A repair unit for a snowmobile drive track comprising a belt like member having a plurality of spaced cross rods extending thereacross against which snowmobile drive sprockets drive, said cross rods being subject to breaking from loads thereon, said repair unit including at least one generally tubular member, said tubular member having an inside cross section of size and shape to fit closely over a portion of one of said cross rods adjacent a break, a pair of flange members mounted on said tubular member and extending outwardly from the tubular member, said tubular member being offset from the flange members, and means to fasten said flange members to said track on opposite sides of said break to hold said portion of a broken cross rod inside said tubular member.

2. The combination as specified in claim 1 wherein a section of said broken cross rod is removed adjacent said break to provide two spaced cross rod portions, the space between said spaced portions being of distance shorter than the length of said tubular member, whereby said tubular member overlaps portions of said broken cross rod adjacent said space.

3. The combination of claim 1 wherein said break is adjacent the portion of the cross rods against which drive sprockets drive, said tubular member having an outer surface of size and shape to provide a surface for drive sprockets to engage to drive said track.

4. The combination of claim 1 wherein said cross rods are molded into said belt-like member and are surrounded by molded material to form a hump extending transversely across said belt, said flange members including planar side portions and a joining section formed to fit over said hump when the side portions are resting on the belt-like member on opposite sides of said hump.

5. A method of repairing a snowmobile drive track comprising a belt-like member having a plurality of transverse rods fixed to said belt-like member, said belt-like member having openings on opposite sides of the transverse rods in portions of said belt through which sprocket teeth may protrude to drive from said sprocket teeth to said belt, and wherein a breakage occurs in said transverse rods adjacent said openings, comprising the steps of removing a section of a broken transverse rod to leave two spaced rod portions, cleaning belt material from said rod portions as necessary to leave exposed ends of said transverse rod portions, mounting a member over both of the exposed ends of said rod portions to extend between the rod portions, and fastening said member in place on said belt on opposite sides of the removed rod section to hold the rod portions of said broken transverse rod in said member.

* * * * *